(12) United States Patent
Brown (10) Patent No.: US 11,858,624 B1
(45) Date of Patent: Jan. 2, 2024

(54) AUXILIARY PROPULSIVE CONTROL FOR ENHANCED TAXIING PERFORMANCE OF SEAPLANES

(71) Applicant: The United States of America, as represented by the Secretary of the Navy, Arlington, VA (US)

(72) Inventor: Robert Henry Brown, Hanover, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 17/748,067

(22) Filed: May 19, 2022

Related U.S. Application Data (60) Provisional application No. 63/193,523, filed on May 26, 2021.

(51) Int. Cl.
*B64C 35/00* (2006.01)
*B64D 31/06* (2006.01)

(52) U.S. Cl.
CPC ............ *B64C 35/001* (2013.01); *B64D 31/06* (2013.01)

(58) Field of Classification Search
CPC ......... B64C 15/00; B64C 15/14; B64C 19/00; B64C 35/001; B64C 35/006
See application file for complete search history.

(56) References Cited

U.S. PATENT DOCUMENTS

| 4,962,978 A | 10/1990 | Weston |
| 8,807,478 B2 | 8/2014 | Meekins et al. |
| 9,227,721 B1 | 1/2016 | Tguyen |
| (Continued) | | |

FOREIGN PATENT DOCUMENTS

| CN | 109353500 A | * | 2/2019 | .............. B60F 5/003 |

OTHER PUBLICATIONS

Hyun Dae Kim, Aaron Perry, and Phillip Ansell, "A Review of Distributed Electric Propulsion Concepts for Air Vehicle Technology," slideshow presentation (20 slides; dated Jul. 12, 2018), AIAA / IEEE Electric Aircraft Technologies Symposium (EATS), Jul. 9-11, 2018, Cincinnati, Ohio.

(Continued)

*Primary Examiner* — Richard G Davis
(74) *Attorney, Agent, or Firm* — Howard Kaiser (57) ABSTRACT

Exemplary inventive practice improves the taxiing dynamics of a seaplane by propulsively imparting roll moments so as to continually encourage levelness of the two wings, thereby maintaining both wings completely above (out of) the water. Two matching motor-driven propellers are correspondingly positioned at or near the wingtips. A computer receives sensory motion inputs and transmits sequential commands that continually adjust the respective propulsive forces of the wingtip propellers by effecting equal and opposite changes in their respective rotational speeds. An increase in one wingtip propeller's rotational speed is concomitant a decrease in the other wingtip propeller's rotational speed, wherein the increase and the decrease are of the same magnitude. The seaplane rolls upward on the wing whose wingtip propeller is increasing in rotational speed. Control of the seaplane's rolling motion is thus enabled by a sustained propulsive equilibrium between the two wingtip propellers.

12 Claims, 11 Drawing Sheets

(56) References Cited

U.S. PATENT DOCUMENTS

| | | |
|---|---|---|
| 9,493,235 B2 | 11/2016 | Zhou et al. |
| 9,751,614 B1 | 9/2017 | Tguyen et al. |
| 9,789,768 B1 | 10/2017 | Meier |
| 10,676,187 B2 | 6/2020 | Bernhardt |
| 2022/0324560 A1* | 10/2022 | Klinker ................. B64D 27/24 |

OTHER PUBLICATIONS

Hyun Dae Kim, Aaron Perry, and Phillip Ansell, "A Review of Distributed Electric Propulsion Concepts for Air Vehicle Technology," paper (21 pages), published online Jul. 8, 2018, AIAA / IEEE Electric Aircraft Technologies Symposium (EATS), Jul. 9-11, 2018, Cincinnati, Ohio (No. AFRC-EDAA-TN57672).

U.S. Appl. No. 63/193,523, filed May 26, 2021, entitled "Auxiliary Propulsive Control for Enhanced Taxiing Performance of Seaplanes," inventor Robert Henry Brown, Navy Case No. 114,160.

* cited by examiner

FIG. 1

FIG. 2A $5° \leq \gamma \leq 20°$

FIG. 2

| | |
|---|---|
| Wing 300 | • Primary lifting device for an aircraft.<br>• Air flowing over the wing creates a pressure differential between the upper and lower surfaces. Difference of pressure acting over an area makes lift, which generates an upward force to balance out gravity.<br>• Requires sufficient airflow to be moving over wing to generate enough lift to balance out the weight of the vehicle.<br>• Wing is critical as control surfaces require airflow as well, which is problematic at low speeds (v = 0 – 15 mph).<br>• Control surfaces are usually near the trailing edge of the wing (The trailing edge is the edge that is trailing with respect to the aircraft, as distinguished from the leading edge, such as shown in FIG. 2). |
| Motor Mount 220 (Auxiliary Propulsion Unit) | • Rigid structure that physically attaches the electric motor to the wing.<br>• In the inventive prototype, the motor mount was a rigid, non-rotating connection.<br>• Invention can also be practiced so that the motor mount is made to rotate (e.g., similarly as a tiltrotor, such as found in the V-22 Osprey).<br>• This mount allows the motor to be angled at some angle $\gamma$ (lowercase letter "gamma") relative to the aircraft fuselage reference line. |
| Motor 230 (Auxiliary Propulsion Unit) | • Small electric motors (small relative to the motors in the main propulsion units). Inventive prototype seaplane used small brushless DC electric motors.<br>• Designed to be high frequency actuators, such that they can rapidly adjust the RPM of their propellers based on a control signal.<br>• Difference in port and starboard wingtip motor RPMs produces a highly controllably roll moment due to the motors being mounted at an angle $\gamma$.<br>• Generally, purpose of electric motor is to exchange electrical power (volts, amps) for mechanical power (RPM, torque). |
| Propeller 240 (Auxiliary Propulsion Unit) | • Purpose is to exchange mechanical power (RPM, torque) for aerodynamic power (thrust, downwash speed).<br>• Made to be light, with low inertia to allow it to quickly change RPM.<br>• RPM is related to propeller thrust, for slow moving vehicles the faster the RPM the greater the thrust. |

FIG. 3

| | |
|---|---|
| Net Thrust, T (Auxiliary Propulsion Unit) | • As the propeller spins, a thrust is generated.<br>• This thrust acts in line with the motor, i.e. normal to the propeller plane.<br>• It is called "net" because it is the vector sum of the horizontal and vertical thrust components. |
| Cant Angle, γ (Auxiliary Propulsion Unit) | • Thrust will act in direction that is normal to the propeller plane.<br>• By using the rigid motor mount to place the motor with some upward angle, γ, now thrust acts in both horizontal and vertical direction.<br>• Useful because vertical force acting far from centerline of aircraft gives us a roll control moment.<br>• An optimization exists:<br>   • Want γ large because the larger γ increases roll control moment which is useful for take-off and landing procedures.<br>   • Want γ small because any force acting upward does not help to propel the aircraft forward, which is inefficient over the entirety of the flight. |
| $T\cos(\gamma)$ (Auxiliary Propulsion Unit) | • Using trigonometry, and knowing the cant angle and the total thrust, this is the horizontal (i.e., forward) force of the motor/propeller.<br>• Thrust must = drag for an aircraft.<br>• The more thrust is diverted upward for roll control means less thrust is available for forward propulsion. |
| $T\sin(\gamma)$ (Auxiliary Propulsion Unit) | • Using trigonometry, and knowing the cant angle and the total thrust, this is the vertical (i.e., upward) force of the motor/propeller.<br>• Lift = weight for an aircraft.<br>• Roll control moment is proportional to (difference in wingtip rotor RPMs)*(distance from centerline to propulsor)*(sine of cant angle) |

| | | |
|---|---|---|
| A. | Desired Roll Angle | Desired roll angle is fed into the control loop. Purpose of the overall control strategy is to drive the measured angle to the desired angle quickly.<br><br>Desired roll angle can come from human operator with a remote controller or from another higher level feedback control loop. |
| B. | Roll Controller | Purpose of the roll controller is to compare desired angle to measured angle and to compute a control action. The output of the controller is the required control forces or moments that must be obtained to reorient the aircraft.<br><br>Roll controller can be a generic PID loop or a more well developed control strategy that includes an analytical model of the aircraft and actuator dynamics. |
| C. | Control Forces and Moments | Output from roll controller. These are the required forces and moments that must be achieved. |
| D. | Control Mixer | Forces and moments must be converted into actuator commands (such as control surface deflections or desired motor RPM commands). For this, a mapping exists that changes the control forces and moments into commands that can be sent to actuators.<br><br>Oftentimes, this control mixer takes in information from the yaw, thrust, and pitch control loops to declare one set of actuator commands for the entire AC at each time step. |
| E. | Actuator Commands | Output from mixer, these are the voltage level commands that will be sent to the servos and motor controllers that will be interpreted as desired actions. |
| F. | Actuator | Control logic levels will be interpreted from actuators. Actuators will deflect or respond accordingly and generate control forces and moments. Aircraft will respond accordingly. |
| G. | Actual Control Forces and Moments | Actions from actuators will generate the real control forces and moments. Movement of actuators involves dynamics which in turn have time delay between desired and actual force/moment commands. |
| H. | Aircraft Motion | Deflection of control surfaces and motor RPM changes cause the aircraft to respond and change orientation. |
| I. | Inertial Measurement Unit | An IMU is able to sense the instantons acceleration and gyroscopic rotation of the aircraft. This information is fused by the attitude heading and reference system (AHRS) to obtain the estimated attitude of the aircraft. Whenever the aircraft moves, this motion is sensed, and a corresponding new attitude is computed. |
| J. | Measured Roll Angle | The IMU and the AHRS estimate the roll angle of the aircraft. This information is used by the roll controller to compute the next control action.<br><br>This is a loop, so the loop repeats itself at 1. |

AUXILIARY PROPULSIVE CONTROL FOR ENHANCED TAXIING PERFORMANCE OF SEAPLANES

CROSS-REFERENCE TO RELATED APPLICATIONS

This patent application claims the benefit of U.S. provisional patent application No. 63/193,523, filed 26 May 2021, hereby incorporated herein by reference, entitled "Auxiliary Propulsive Control for Enhanced Taxiing Performance of Seaplanes," inventor Robert Henry Brown.

STATEMENT OF GOVERNMENT INTEREST

The inventorship of the invention described herein includes at least one person who invented the invention in performance of the person's official duties as an employee of the Department of the Navy. The invention may be manufactured, used, and licensed by or for the Government of the United States of America for governmental purposes without payment of any royalties thereon or therefor. The Government of the United States of America has ownership rights in the invention.

BACKGROUND OF THE INVENTION

The present invention relates to aerodynamics, hydrodynamics, and propulsion of winged aircraft, more particularly to control of seaplanes when taxiing on water.

The term "seaplane" is conventionally understood to refer to an aircraft that is capable of effecting takeoffs and landings on water. A typical seaplane is an aircraft that is powered and has fixed wings. Although terminology pertaining to seaplanes has varied, seaplanes are generally considered to be divided into two categories, viz., flying boats and floatplanes.

A typical floatplane has at least two floats that are mounted under the fuselage. A floatplane is designed so that, in operation, its fuselage remains above water at all times. As distinguished from a floatplane, a flying boat has a hydrodynamically shaped fuselage that acts as a marine hull to facilitate maneuvering on, taking off from, and landing on a body of water. A typical flying boat has at least two floats or pontoons that are mounted, typically in a balanced arrangement under the wings on opposite sides of the fuselage, in order to lend stability to the flying boat while on the water. In common usage the terms "float" and "pontoon" have often been used synonymously in marine contexts, and these terms are used interchangeably herein.

A seaplane is a type of vehicle that is both an air vehicle and a water vehicle. It is designed to fly in the air, maneuver on water, take off from water, and land on water. Seaplanes are intended to take off and land in calm seas, and to avoid taking off and landing in unsteady waves. Rough waters pose an operational hazard while a seaplane is taxiing. For instance, if a float beneath a wing catches a forceful wave while a flying boat is taxiing, this can result in serious injury to crew and/or significant damage to aircraft and cargo. Historically, seaplanes have experienced difficulties in taking off and landing in unsteady waters. Since World War II there has not been an abundance of technical literature on seaplanes.

SUMMARY OF THE INVENTION

In view of the foregoing, an object of the present invention is to provide method and apparatus for exercising greater control of speed, position, and orientation of a seaplane during taxiing so as to reduce or minimize risk to the seaplane and to persons and property onboard the seaplane.

According to exemplary inventive practice, a fixed-wing aircraft includes a fuselage, a pair of wings, a pair of roll-control propulsors, and a computer. The wings respectively project from opposite sides of the fuselage. The roll-control propulsors are each attached to a different wing and are operable for exerting a propulsive force. The computer has computer code characterized by computer program logic for controlling motion of the fixed-wing aircraft. The computer code is executable by the computer so that, in accordance with the computer program logic, the computer performs acts including: (i) increasing the propulsive force exerted by a first roll-control propulsor; and (ii) commensurately decreasing the propulsive force exerted by the second roll-control propulsor. The fixed-wing aircraft experiences a roll moment having associated therewith an upward roll motion of the wing to which is attached the roll-control propulsor that is exerting an increased propulsive force. According to frequent inventive practice, each roll-control propulsor includes a roll-control propeller. The increasing of the propulsive force exerted by the first roll-control propulsor includes increasing the rotational speed characterizing the corresponding roll-control propeller. The commensurate decreasing of the propulsive force exerted by the second roll-control propulsor includes decreasing the rotational speed characterizing the corresponding roll-control propeller.

Exemplary practice of the present invention features, inter alia, inventive implementation of "wingtip" propulsors so as to improve taxiing performance of seaplanes at both lower speeds and higher speeds. In particular, the present invention as exemplarily embodied improves the roll control authority of seaplanes while taxiing in the water. This increased control authority helps ensure that a seaplane's wingtip floats remain out of the water and the seaplane's wings remain level, thus improving seakeeping performance and reducing water takeoff distances. An inventive seaplane can be embodied as a manned vehicle or an unmanned vehicle. Depending on the inventive embodiment, a wingtip propulsor may include, for instance, a fluid or particle "thruster" (e.g., jet engine), or a motor-and-propeller combination, or another type of propulsive apparatus.

Conventional seaplanes are manned vehicles that use large traditional internal combustion engines (ICEs), turbine engines, or jet engines as their main power-plant. More recently, distributed electric propulsion (commonly abbreviated "DEP") has been disclosed in the literature wherein plural electric motors/engines (e.g., of relatively small size) are placed on a single aircraft. The present invention can be practiced implementing any of a variety of engines or motors, including but not limited to ICEs, turbine engines, jet engines, distributed electric propulsors, etc. The terms "engine" and "motor" are used interchangeably herein. An engine/motor may operate, for instance, on combustion or electricity. Accordingly, terms such as "motor mount" and "engine mount" are used interchangeably herein. In addition, the terms "propeller" and "rotor" are used interchangeably herein.

The terms "wingtip propulsor," "auxiliary propulsor," and "roll-control propulsor" are used synonymously herein to refer to a propulsor that is the outboardmost propulsor with respect to the inventive aircraft wing to which the propulsor is attached. The word "wingtip" in the term "wingtip propulsor" emphasizes that, in accordance with exemplary inventive practice, the inventive wingtip/auxiliary/roll-control propulsor is at, or near, or in the vicinity of the wingtip. The word "auxiliary" in the term "auxiliary propulsor" emphasizes that, in accordance with exemplary inventive practice, the inventive wingtip/auxiliary/roll-control propulsor accompanies or supplements a "main propulsor," which is further inboard than the inventive wingtip/auxiliary/roll-control propulsor. The hyphenated word "roll-control" in the term "auxiliary propulsor" emphasizes that, in accordance with exemplary inventive practice, the propulsive force of the inventive wingtip/auxiliary/roll-control propulsor is controlled by a computer for purposes of adjusting the roll of the inventive aircraft.

BRIEF DESCRIPTION OF THE DRAWINGS

The present invention will now be described, by way of example, with reference to the accompanying drawings, wherein like numbers indicate same or similar parts or components, and wherein:

FIGS. 3 and 4 are tables that are explanatory with respect to the configurations and forces shown, by way of example of inventive practice, in FIGS. 1, 2, and 2A.

FIG. 6 is a table that is explanatory with respect to the example shown in FIG. 5 of a computer control system for an inventive seaplane.

DESCRIPTION OF EXEMPLARY
EMBODIMENTS OF THE INVENTION

Figure 1:
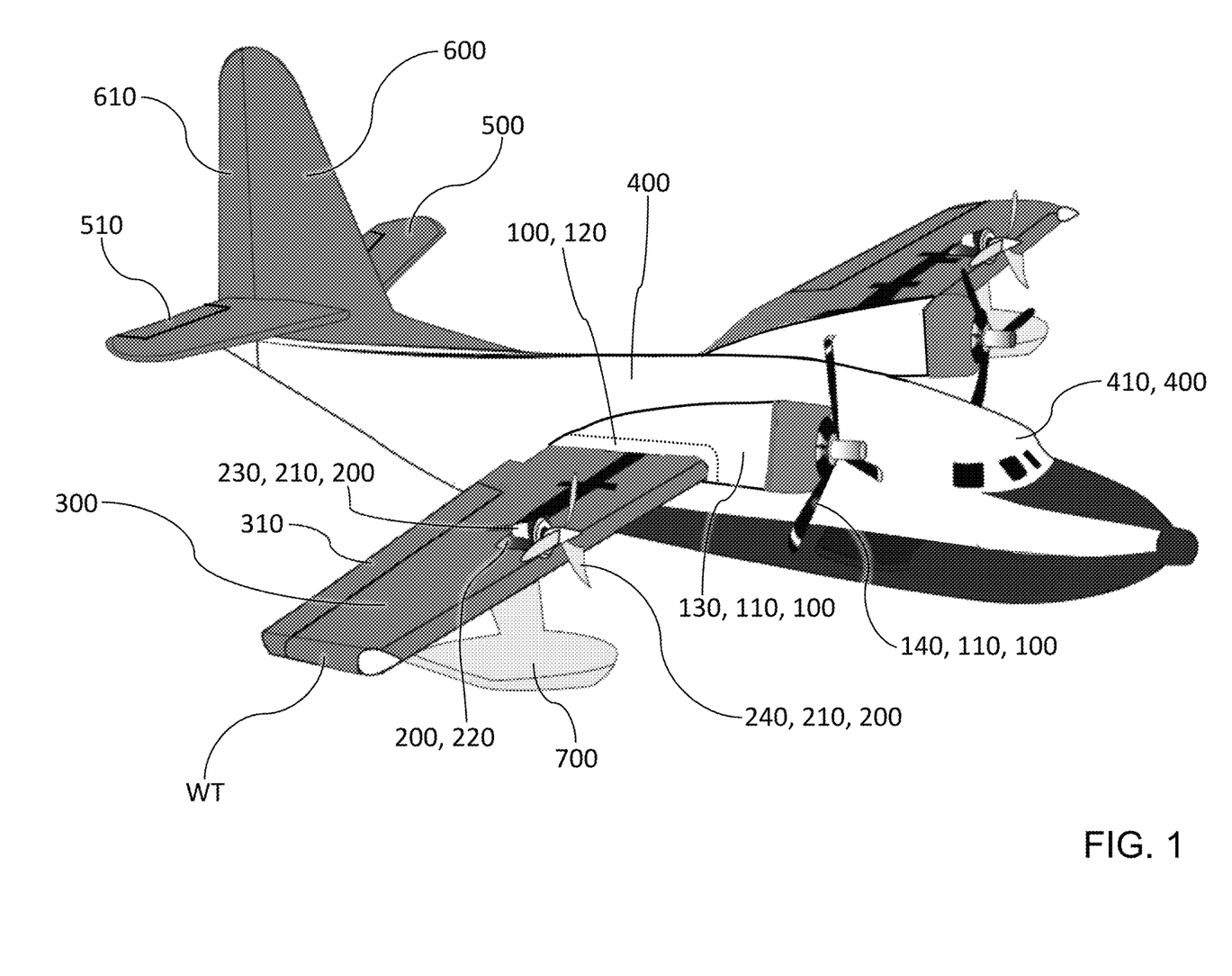
FIG. 1 is a perspective view depicting an example of an inventive seaplane. The present inventor made and tested an inventive prototype similar to the inventive seaplane shown in FIG. 1.

Referring now to FIGS. 1 through 4, an embodiment of an inventive seaplane includes two main propulsion assemblies 100, two auxiliary propulsion assemblies 200, two wings 300, a fuselage 400, two horizontal stabilizers 500, a vertical stabilizer 600, and two floats (pontoons) 700. Each wing 300 has a wingtip WT. Each main propulsion assembly 100 includes a main propulsor 110 and a main propulsor motor mount 120. Each main propulsor 110 includes a main motor 130 and a main propeller 140. Each auxiliary propulsion assembly 200 includes an auxiliary propulsor 210 and an auxiliary propulsor motor mount 220. Each auxiliary propulsor 210 includes an auxiliary motor 230 and an auxiliary propeller 240. In addition to wings 300, the inventive seaplane is shown in FIG. 1 as being provided with airfoils including two ailerons 310, two elevators 510, and a rudder 610. Fuselage 400 includes a cockpit 410. Depending on the embodiment, an inventive seaplane may include other control surfaces such as flaps, spoilers, slats, etc.

Figures 2, 2A:
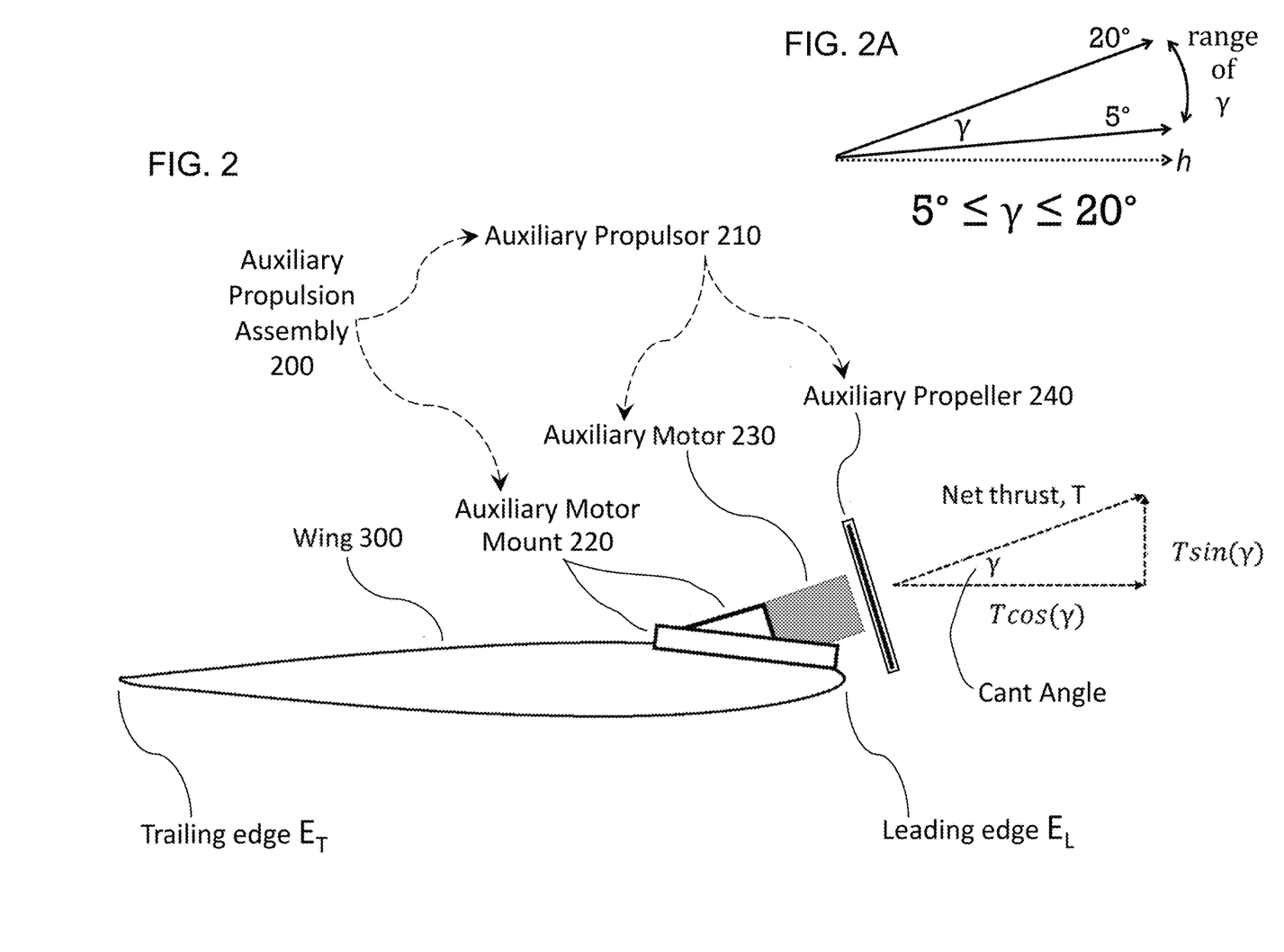
FIG. 2 is a diagram illustrating an example of an auxiliary propulsion assembly mounted on a wing, in accordance with the present invention.
FIG. 2A is a geometric illustration of a preferred angular range, upward and downward, characterizing an auxiliary propulsor in accordance with exemplary practice of the present invention.

According to exemplary inventive practice an inventive seaplane includes two congruous auxiliary propulsors 210, which are situated on opposite wings 300 at or near opposite ends of the wingspan s. Each wing 300 has a leading edge $E_L$, and a trailing edge $E_T$. The auxiliary propulsor on the lefthand wing 300 and the auxiliary propulsor 210 on the righthand wing 300 are preferably the same make-and-model propulsive device, in keeping with a conventional approach of providing a matching pair of propulsive devices on the port and starboard sides, respectively. Each auxiliary propulsor 210 is mounted at a slight or moderate upward angle γ such as shown in FIGS. 2 and 2A, and is situated in the vicinity of one of the two opposite wingtips WT of the inventive seaplane such as shown in FIGS. 1 and 7 through 9. The inventive outboard propulsors 210 (synonymously referred to herein as "auxiliary propulsors" or "wingtip propulsors" or "roll-control propulsors") improve the roll control authority of the seaplane. For example, if the inventive seaplane is a flying boat, this increased roll control authority helps ensure that the inventive seaplane's two floats 700, located in proximity to the corresponding wingtips WT, remain out of the water during low-speed, medium-speed, and high-speed taxiing operations.

Still referring to FIGS. 2 and 2A, an inventive seaplane is exemplarily embodied wherein the inventive auxiliary propulsors 210 are each fixed at an upward angle γ, relative to a horizontal planar geometric reference h, which is the horizontal geometric axial plane in which lies the longitudinal axis CL (also referred to herein as the "centerline" or "midline") defined by the inventive seaplane's fuselage. According to frequent inventive practice, this upward angle γ is in the range between about five degrees and about twenty degrees, such as illustrated by way of example in FIG. 2A; that is, upward angle γ is within the range of $5° \leq \gamma \leq 20°$. According to some inventive embodiments, the upward angle γ of auxiliary propulsor 210 is adjustable (such as by implementing a computer) so as to be pivotably increased or decreased, auxiliary propulsor 210 thus bearing similarity to a tiltrotor. As depicted in FIG. 2, auxiliary propulsor 210 is disposed at an upward angle γ measuring roughly 20 degrees. According to some inventive embodiments, upwardly-downwardly rotating tiltrotor-like capability of this nature can be attributed to the main propulsors 110 as well, instead of or in addition to either in addition to such upwardly-downwardly rotating tiltrotor-like capability being attributed to the auxiliary propulsors 210. An exemplary angular range such as $5° \leq \gamma \leq 20°$ shown in FIG. 2A would similarly apply to many embodiments of upwardly-downwardly rotatable main propulsors 110.

Figure 7:
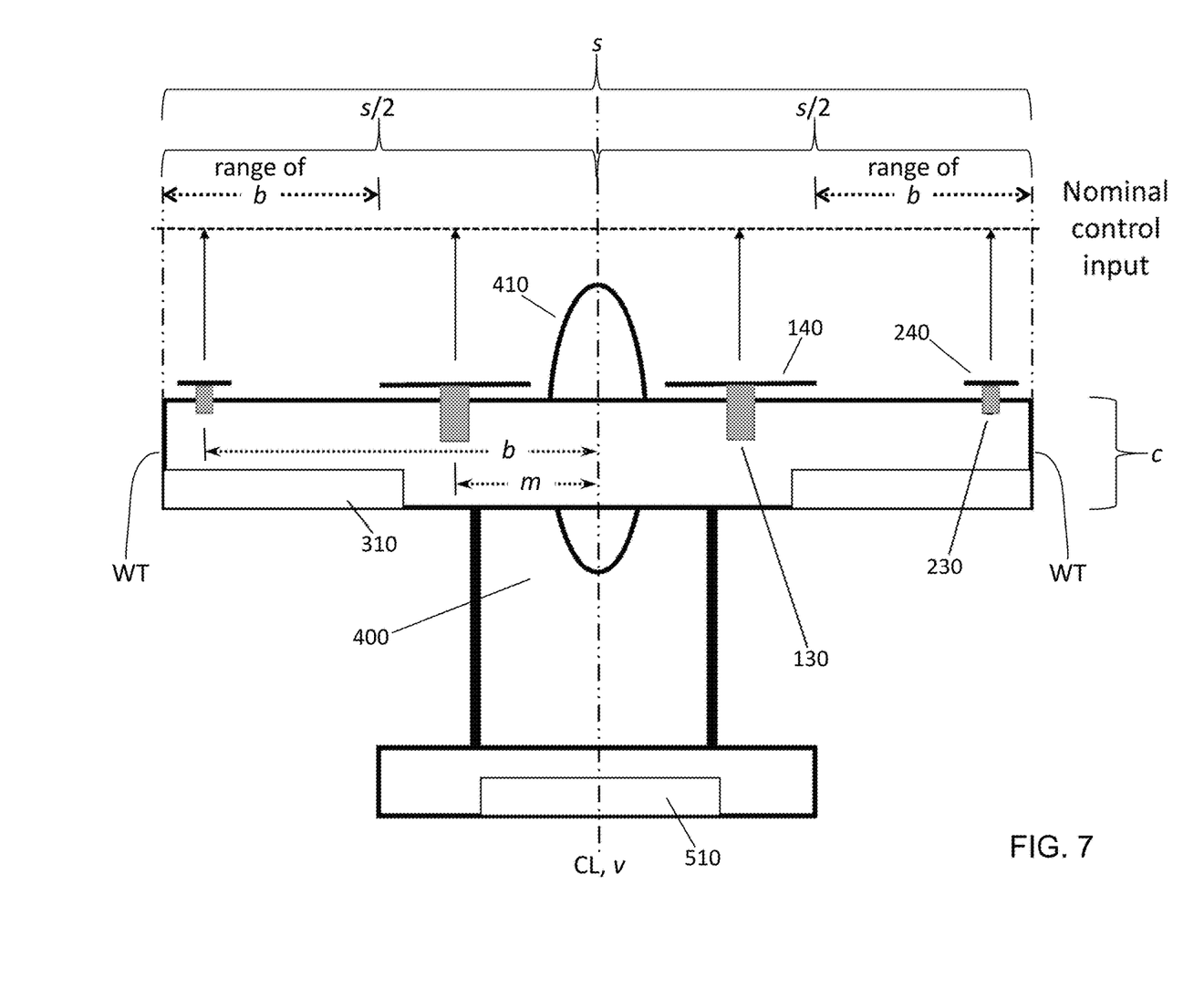
FIGS. 7 through 9 are each essentially the same plan view of the same example of an inventive seaplane. Inter alia, FIGS. 7 through 9 exemplarily illustrate control of various flight characteristics of a seaplane in accordance with the present invention.

Furthermore, with reference to FIG. 7, according to exemplary inventive practice each auxiliary propulsor 210 is positioned on the wing 300 at an outboard distance b along the wing's semi-span s/2, wherein "s/2" is the half-length of span s. Exemplary inventive practice provides for equal values of b for the two auxiliary propulsors 210 situated on opposite sides of fuselage 400. Each auxiliary propulsor 210 is placed at the same distance b from the longitudinal axis CL, starboard distance b and port distance b thereby being equal. An auxiliary propulsor 210's outboard distance b is defined herein as the span-wise distance along semi-span s/2 from the vertical geometric axial plane v in which lies the longitudinal axis CL of the inventive seaplane. Distance b is the semi-span distance of auxiliary propulsor 210 relative to vertical geometric axial plane v.

Depending on the inventive embodiment, placement selection for the auxiliary propulsors 210 may take into consideration the relationship of the outboard distance b to the control moment. The closer an auxiliary propulsor 210 is placed to the wingtip WT, the larger the control moment. According to exemplary inventive practice, each auxiliary propulsor 210's outboard distance b is in the range between 50% and 100% of the wing 300's semi-span s/2 with respect to the longitudinal axis CL (or vertical axial plane v) of the fuselage 400, wherein the 50% position of the auxiliary propulsor 210 is midway between the longitudinal axis CL and the wingtip WT, and wherein the 100% position of the auxiliary propulsor 210 is at the wingtip WT. According to frequent inventive practice, b is at least 65% of the wing's semi-span s/2. That is, it may be especially advantageous to place each auxiliary propulsor 210 at a semi-span distance b from the centerline CL in the range between 65% and 100%.

Figure 5:
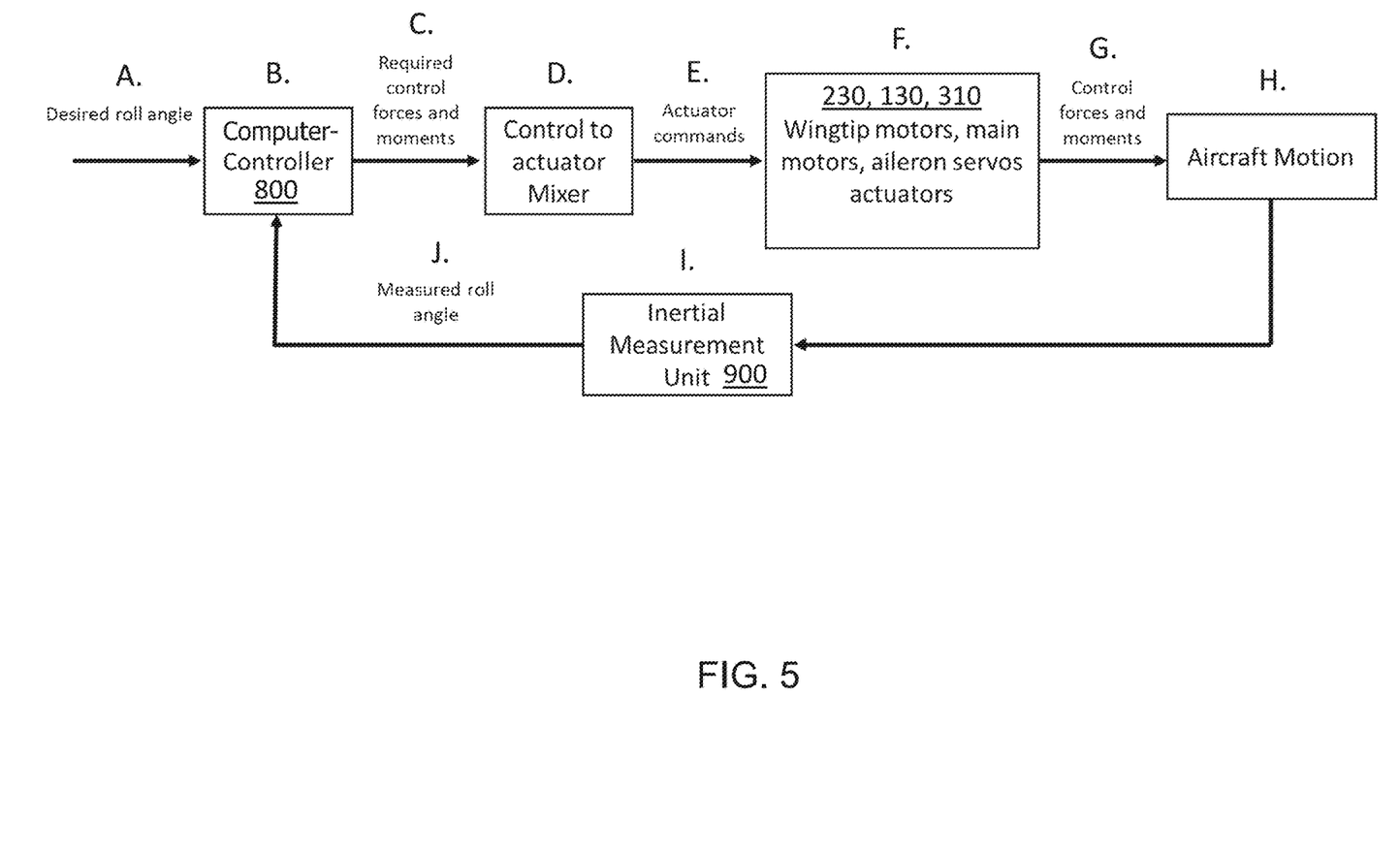
FIG. 5 is a flow diagram of an example of a computer control system in accordance with the present invention.
Figure 8:
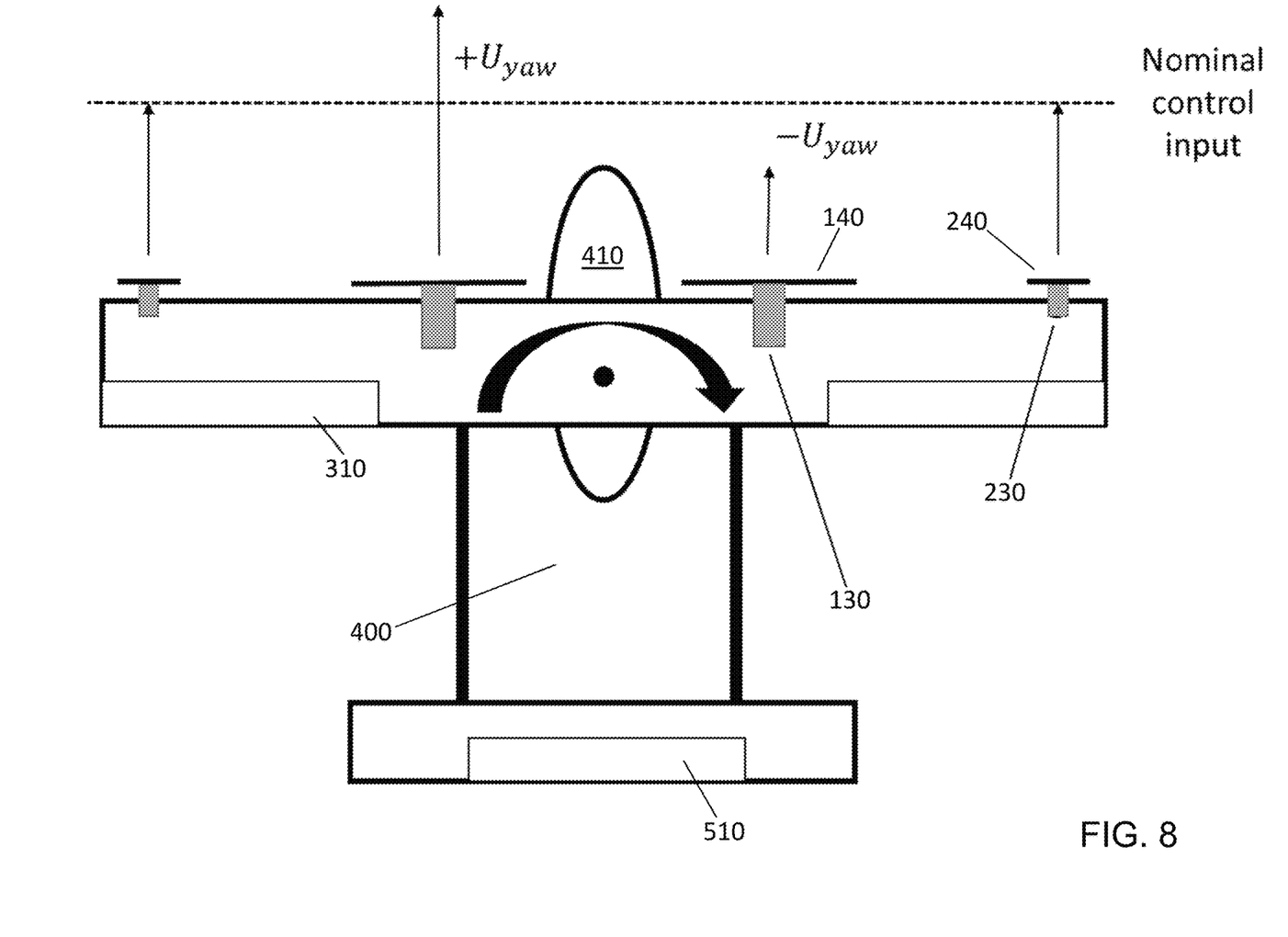
Figure 9:
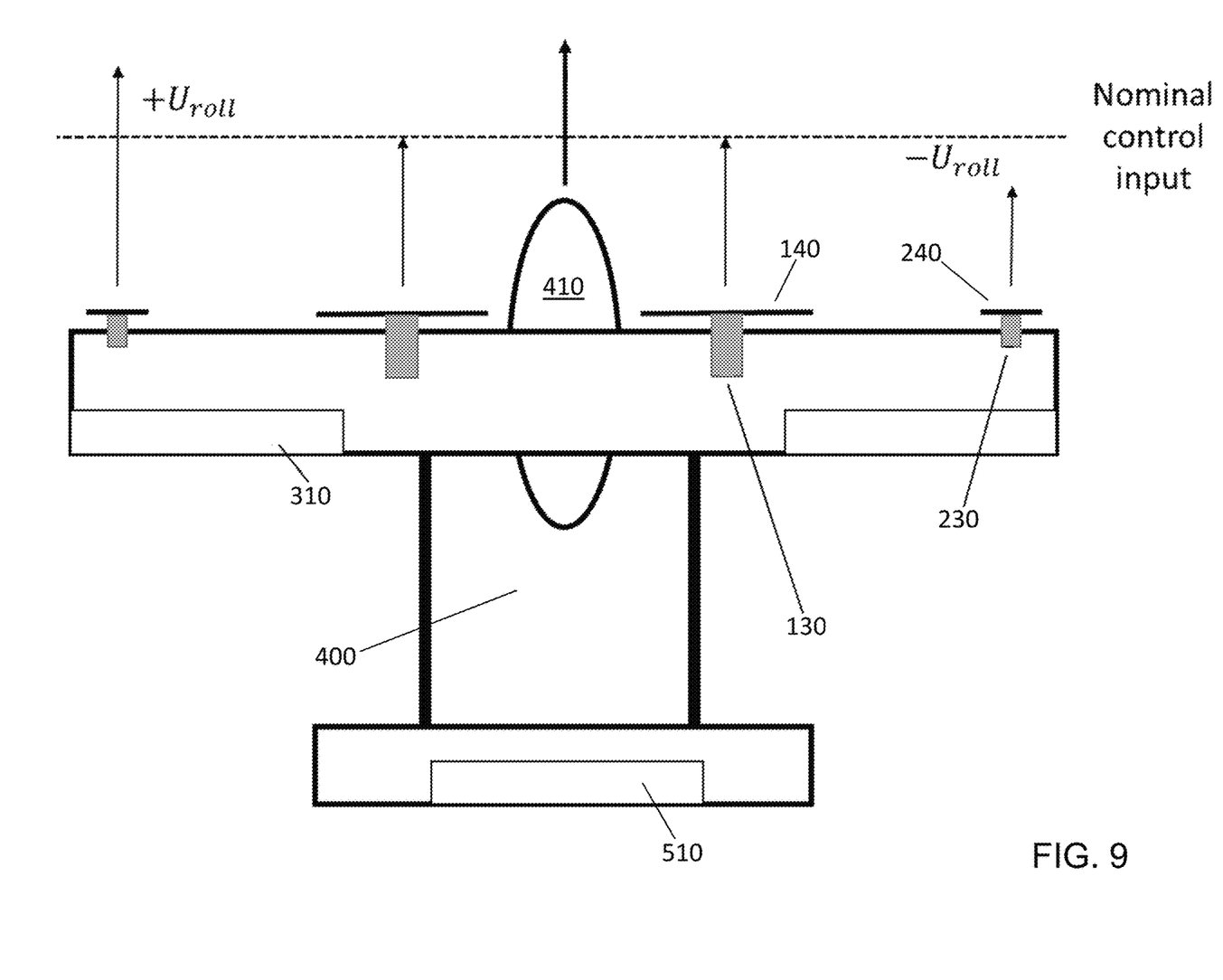
Figure 10:
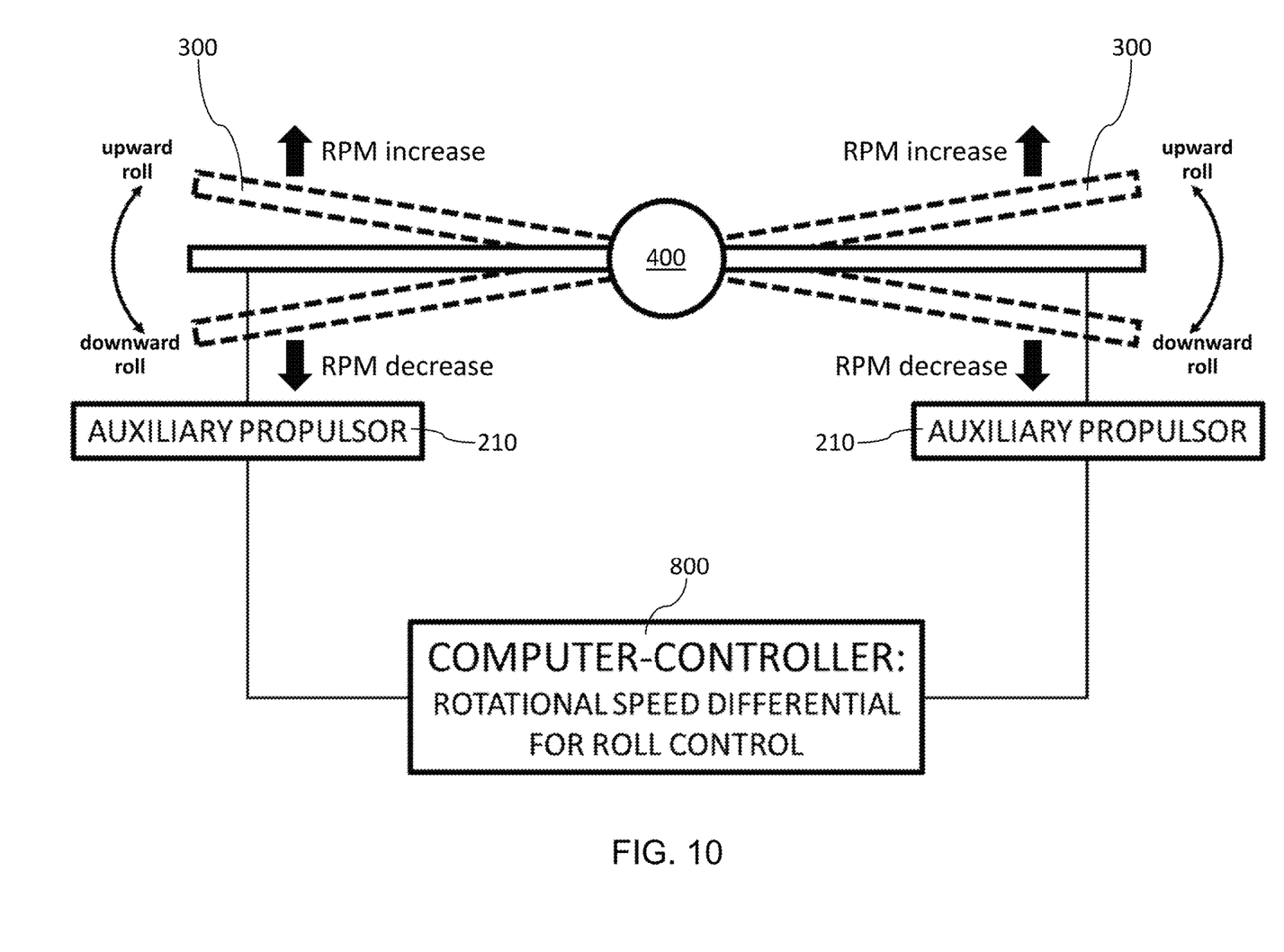
FIG. 10 is a diagram exemplarily illustrating roll control, by means of a computer and auxiliary propulsive devices, of a seaplane in accordance with the present invention.

Particularly with reference to FIGS. 5 through 10, according to exemplary inventive practice two auxiliary propulsors 210 (e.g., including motors 230 and propellers 240) are situated at or toward opposite ends, viz., wingtips WT, of the wingspan s. The rotational speed (e.g., revolutions per minute, acronym "RPM") of each auxiliary propulsor 210 is controlled via loop feedback logic using a computer 800. FIG. 8 illustrates yaw control using main propulsors, in accordance with the present invention. FIGS. 9, and 10 illustrate roll control using auxiliary propulsors, in accordance with the present invention. As illustrated in FIG. 5, on an ongoing basis computer control signals are received by motors and actuators, and flight characteristics of the inventive seaplane are determined using an inertial measurement unit 900. Based on information (e.g., roll angle data) received from inertial measurement unit 900, computer 800 adjusts the control signals that it is transmitting to the motors and the actuators. The terms "computer" and "computer-controller" are used synonymously herein.

As illustrated in FIGS. 9 and 10, in every instance in which the RPM of an auxiliary propulsor 210 is increased, the RPM of the other auxiliary propulsor 210 is equally and oppositely decreased, i.e., decreased in the same amount. Conversely, in every instance in which the RPM of an auxiliary propulsor 210 is decreased, the RPM of the other auxiliary propulsor 210 is equally and oppositely increased, i.e., increased in the same amount. An increase in RPM of an auxiliary propulsor 210 results in an upward roll of the wing 300 on which the propulsively augmented auxiliary propulsor 210 is situate, and is concomitant a commensurate (equal) decrease in RPM of the opposite auxiliary propulsor 210 and an attendant downward roll of the opposite wing 300. In this manner, exemplary inventive practice exercises dual equivalent control of the respective rotational speeds of the auxiliary propulsors 210, thereby improving the roll control authority of a seaplane, particularly while taxiing in the water. According to some inventive embodiments, the wingtip motors provide additional roll control by placing the ailerons in the slipstream of the wingtip motors, such as shown by way of example in FIGS. 1 and 7 through 9. The additional airflow over the control surfaces increases control authority at all speeds.

Exemplary inventive vehicles include, on opposite wings 300, two congruous auxiliary propulsors 210 and two congruous main propulsors 110, wherein the auxiliary propulsors 210 are outboard of the main propulsors 110. According to exemplary inventive practice, each main propulsor 110 has the same outboard distance m, which is no greater than 50% of the wing 300's semi-span s/2 with respect to the longitudinal axis CL (or vertical axial plane v) of the fuselage 400; according to frequent inventive practice, each main propulsor 110's outboard distance m is no greater than 35% of the wing 300's semi-span s/2 with respect to the longitudinal axis CL/axial plane v. Similarly as the rotational speed of each auxiliary propulsor 210 is controlled using a computer 800, the rotational speed of each main propulsor 110 is controlled using a computer 800 (e.g., the same computer). As shown in FIG. 8, in every instance in which the RPM of a main propulsor 110 is changed (i.e., increased or decreased), the RPM of the other main propulsor 110 is equally and oppositely changed (i.e., decreased or increased in the same amount), thereby creating a net yaw moment. Computer control is thereby brought to bear not only on the two opposite auxiliary propulsors 210 in furtherance of roll adjustment, but also on the two opposite main propulsors 110 in furtherance of yaw adjustment.

Still referring to FIG. 8, in every instance in which the RPM of a main propulsor 110 is increased, the RPM of the other main propulsor 110 is equally and oppositely decreased, i.e., decreased in the same amount. Conversely, in every instance in which the RPM of a main propulsor 110 is decreased, the RPM of the other main propulsor 110 is equally and oppositely increased, i.e., increased in the same amount. An increase in RPM of a main propulsor 110 results in an forward yaw of the wing 300 on which the propulsively augmented main propulsor 110 is situate, and is concomitant a commensurate (equal) decrease in RPM of the opposite main propulsor 110 and an attendant backward yaw of the opposite wing 300. In this manner, exemplary inventive practice exercises dual equivalent control of the respective rotational speeds of the main propulsors 110, thereby improving the yaw control authority of a seaplane, particularly while taxiing in the water. In this sense, at least, the main propulsors 110 are alternatively referred to herein as "yaw-control" propulsors.

According to exemplary inventive practice, inventive control can also be exercised with respect to one, some, or all of the control surfaces (e.g., ailerons, elevator(s), rudder, flaps, etc.) of an inventive vehicle. Depending on the inventive embodiment, a vehicular control system may be effected for instance with respect to: (i) the auxiliary propulsors 210; or (ii) the auxiliary propulsors 210 and the main propulsors 110; or (iii) the auxiliary propulsors 210 and one or more control surfaces; or (iv) the auxiliary propulsors 210 and the main propulsors 110 and one or more control surfaces. An inventive control system that unifies and synchronizes control of the auxiliary propulsors 210, the main propulsors 110, and the control surfaces can thereby propitiously control the inventive vehicle in a combined, holistic manner.

Exemplary inventive practice features, inter alia, intermittent or continual effectuation of a roll control wingtip differential, while a vehicle is taxiing on water. Roll-control propulsors 210 (e.g, including small electric motors and rotors) are attached proximate the tips WT of the aircraft's wings 300 and are canted at an upward angle γ in order to: (i) increase the roll control authority of the aircraft at low speeds; and (ii) provide additional forward thrust to reduce takeoff distances. When the wingtip motors spin their rotors at different RPMs (i.e., a differential RPM), a net roll moment is created. When the wingtip motors spin their rotors at the same RPM, additional forward thrust is created. In accordance with exemplary inventive practice, a primary purpose of the present invention's additional roll moment is to significantly improve performance when seaplanes are first accelerating for takeoff, as the seaplanes are moving through the water at low speeds and this is when traditional aircraft control surfaces are ineffective. Note that traditionally an aircraft uses ailerons to control roll, a rudder to control yaw, and one or more elevators to control pitch.

Aircraft control surfaces work by directing air to generate control moments. However when an aircraft is traveling at low speeds, not enough air moves over the control surface, which significantly affects the aircraft's performance. If a seaplane is unable to keep its wings level during take-off or landings (i.e., at a roll angle of 0°), one of the wingtip floats can impact the water, which reduces speed and causes drag—often resulting in the seaplane yawing off course. According to exemplary inventive practice, computer control of auxiliary propulsors is inventively effected to improve roll control authority, thereby enabling seaplanes to remain wings-level while taking off and landing in challenging environmental conditions such as ocean waves or unsteady seas. Using the wingtip motors to generate control moments results in the seaplane remaining wing level throughout the entire taxing process.

Figure 11:
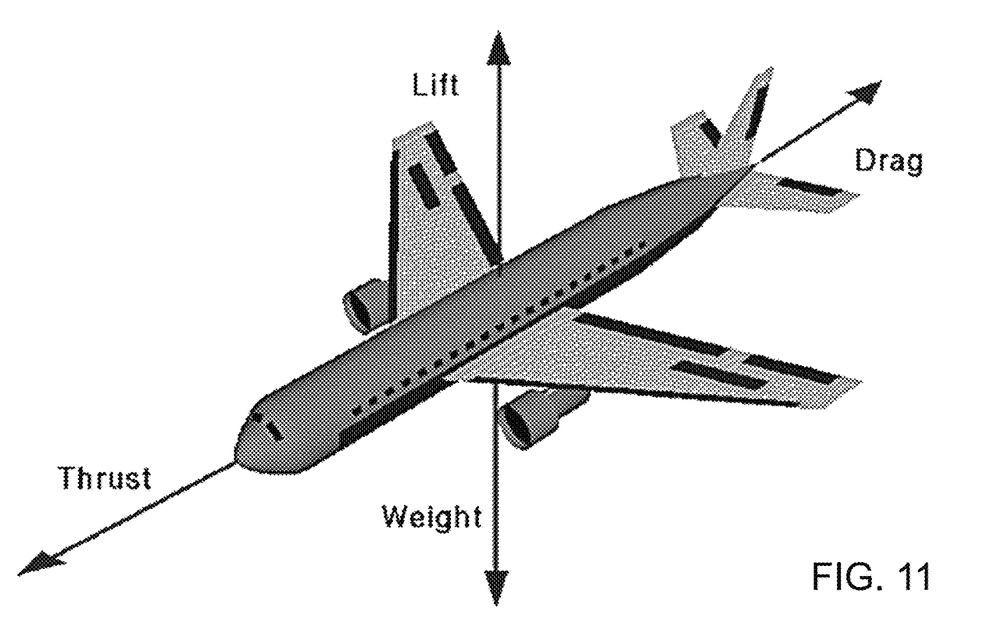
FIGS. 11 and 12 are diagrams, published online by the National Aeronautics and Space Administration (NASA), that are illustrative of some basic conventional concepts involving forces and rotational axes characterizing flight of a notional airplane.
Figure 12:
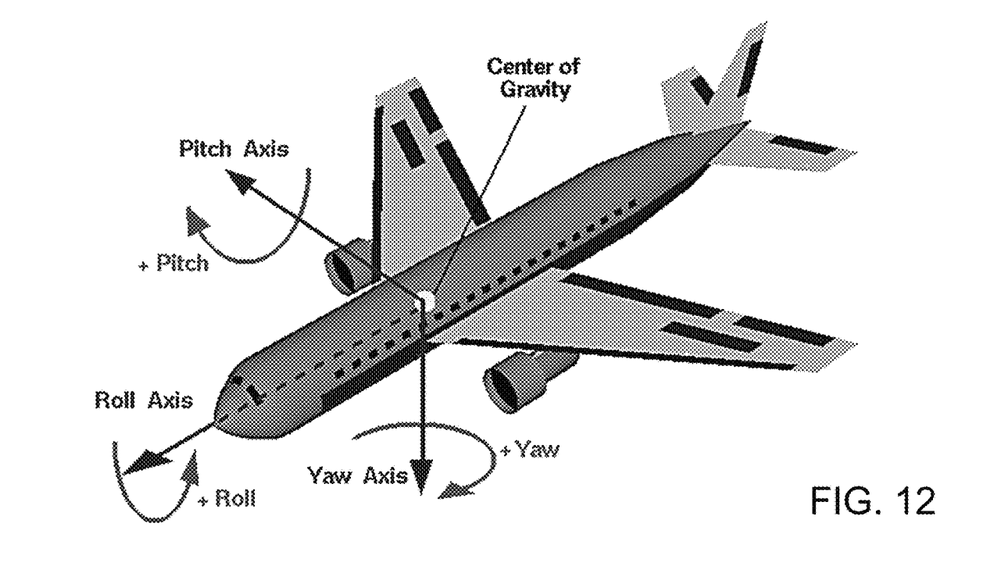

Accordingly, certain fundamental principles of airplane flight are availed of in unique and beneficial ways through exemplary practice of the present invention. FIGS. 11 and 12 are illustrations taken directly from internet webpages of the Glenn Research Center (GRC) of the National Aeronautics and Space Administration (NASA), and are instructive at a basic level with regard to airplanes in general. Shown in FIGS. 11 and 12 are four forces of flight (lift, weight, thrust, drag) acting on a generically representative airplane, and three axes of rotation (roll axis, pitch axis, and yaw axis) of the same airplane. As used herein, the terms "roll axis," "pitch axis," and "yaw axis," are synonymous with the terms "longitudinal axis," "lateral axis," and "vertical axis," respectively.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A fixed-wing aircraft comprising:
a fuselage;
a pair of wings respectively projecting from opposite sides of said fuselage;
a pair of roll-control propulsors each being attached to a different said wing and being operable for exerting a propulsive force;
a pair of yaw-control propulsors each being attached to a different said wing and being operable for exerting a propulsive force;
a computer having computer code characterized by computer program logic for controlling motion of the fixed-wing aircraft, said computer code being executable by said computer so that, in accordance with said computer program logic, said computer performs acts including:

increasing said propulsive force exerted by a first said roll-control propulsor;
commensurately decreasing said propulsive force exerted by a second said roll-control propulsor;
increasing said propulsive force exerted by a first said yaw-control propulsor;
commensurately decreasing said propulsive force exerted by a second said yaw-control propulsor;
wherein the fixed-wing aircraft experiences a roll moment having associated therewith an upward roll motion of said wing to which is attached said roll-control propulsor that is exerting an increased said propulsive force;
wherein on each said wing, said yaw-control propulsor is situated inboard of said roll-control propulsor;
wherein the fixed-wing aircraft experiences a yaw moment having associated therewith a forward yaw motion of said wing to which is attached said roll-control propulsor that is exerting an increased said propulsive force.

2. The fixed-wing aircraft of claim 1, wherein:
each said roll-control propulsor includes a roll-control propeller;
said increasing of said propulsive force exerted by the first said roll-control propulsor includes increasing the revolutions-per-minute characterizing the corresponding said roll-control propeller;
said commensurate decreasing of said propulsive force exerted by the second said roll-control propulsor includes decreasing the revolutions-per-minute characterizing the corresponding said roll-control propeller.

3. The fixed-wing aircraft of claim 1, wherein:
said fixed-wing aircraft is characterized by a geometric longitudinal axis and a geometric vertical plane on which lies said geometric longitudinal axis;
each said wing is characterized by a wingtip and the same span-wise dimension from said geometric vertical plane to said wingtip;
on each said wing, said roll-control propulsor is situated at the same span-wise distance from said geometric vertical plane;
said span-wise distance of said roll-control propulsor from said geometric vertical plane is at least half of said span-wise dimension.

4. The fixed-wing aircraft of claim 1, wherein said span-wise distance of said roll-control propulsor from said geometric vertical plane is at least 65% of said span-wise dimension.

5. The fixed-wing aircraft of claim 1, further comprising a pair of mounts, wherein:
each said mount facilitates said attaching of a said roll-control propulsor to a said wing;
said computer performs acts including adjusting the orientation of the corresponding said roll-control propulsor in a vertical geometric plane;
said adjusting of said orientation includes rotating the associated said roll-control propulsor upward and downward so that said propulsive force is exerted in a direction that is in the range between five degrees and twenty degrees above a horizontal geometric plane;
said mount is used in performing said adjusting of said orientation.

6. The fixed-wing aircraft of claim 1, wherein:
each said yaw-control propulsor includes a yaw-control propeller;
said increasing of said propulsive force exerted by the first said yaw roll-control propulsor includes increasing the revolutions-per-minute characterizing the corresponding said yaw-control propeller;

said commensurate decreasing of said propulsive force exerted by the second said yaw roll-control propulsor includes decreasing the revolutions-per-minute characterizing the corresponding said yaw-control propeller.

7. The fixed-wing aircraft of claim 1, wherein:

said fixed-wing aircraft is characterized by a geometric longitudinal axis and a geometric vertical plane on which lies said geometric longitudinal axis;

each said wing is characterized by a wingtip and the same span-wise dimension from said geometric vertical plane to said wingtip;

on each said wing, said yaw-control propulsor is situated at the same span-wise distance from said geometric vertical plane;

said span-wise distance of said yaw-control propulsor from said geometric vertical plane is no greater than half of said span-wise dimension.

8. The fixed-wing aircraft of claim 7, wherein said span-wise distance of said yaw-control propulsor from said geometric vertical plane is no greater than half of said span-wise dimension.

9. The fixed-wing aircraft of claim 1, further comprising a pair of mounts, wherein:

each said mount facilitates said attaching of a said yaw-control propulsor to a said wing;

said computer performs acts including adjusting the orientation of the corresponding said yaw-control propulsor in a vertical geometric plane;

said adjusting of said orientation includes rotating the associated said yaw-control propulsor upward and downward so that said propulsive force is exerted in a direction that is in the range between five degrees and twenty degrees above a horizontal geometric plane;

said mount is used in performing said adjusting of said orientation.

10. A seaplane comprising a fuselage, two wings oppositely projecting from said fuselage, two propellers each mounted on a said wing at a location on said wing that is at least 65% of the semi-span distance from the longitudinal axis of said fuselage to the wingtip of said wing, at least one flotation component, a motion sensor for sensing the rolling motion of said seaplane, and a computer communicating with said motion sensor, wherein while said seaplane is taxiing in water:

said at least one flotation component is implemented in furtherance of sustaining a degree of buoyancy of said seaplane;

on a feedback-loop basis, said computer receives signals from said motion sensor and adjusts a rolling motion of said seaplane;

said adjustment of said rolling motion of said seaplane includes equal and opposite variation, in terms of increase and decrease, with respect to respective values of revolutions-per-minute characterizing said propellers;

wherein an upward rolling moment is applied to said wing having mounted thereon said propeller that is characterized by an increase in said value of revolutions-per-minute.

11. The seaplane of claim 10, wherein said rolling motion of said seaplane is adjusted so that neither wing contacts the water.

12. The seaplane of claim 10, wherein said at least one flotation component includes two pontoons each connected to a said wing beneath said wing.

* * * * *